United States Patent
McCormick et al.

(10) Patent No.: US 8,268,943 B2
(45) Date of Patent: Sep. 18, 2012

(54) PREPARATION OF SUPPORTED CHROMIUM CATALYST AND POLYMERIZATION PROCESS

(75) Inventors: Ricky McCormick, Sealy, TX (US); David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/454,574

(22) Filed: Apr. 24, 2012

(65) Prior Publication Data

US 2012/0208694 A1 Aug. 16, 2012

Related U.S. Application Data

(62) Division of application No. 12/012,038, filed on Jan. 31, 2008.

(51) Int. Cl.
*C08F 4/24* (2006.01)
*C08F 2/00* (2006.01)
*B01J 23/00* (2006.01)

(52) U.S. Cl. .................. 526/106; 526/64; 502/319

(58) Field of Classification Search .......... 526/64, 526/106; 502/319

See application file for complete search history.

(56) References Cited

U.S. PATENT DOCUMENTS

| | | | |
|---|---|---|---|
| 3,637,637 A | 1/1972 | Saccardo et al. | |
| 4,252,928 A * | 2/1981 | Eve ........................... | 526/106 |
| 6,201,077 B1 | 3/2001 | Bergmeister et al. | |
| 6,372,867 B1 | 4/2002 | Speakman | |
| 2008/0269441 A1 | 10/2008 | Guenther et al. | |

FOREIGN PATENT DOCUMENTS

FR 2671802 A1 7/1992

* cited by examiner

*Primary Examiner* — William Cheung

(57) ABSTRACT

A process for the preparation of a chromium-type supported olefin polymerization catalyst. A fluidized bed of support particles in an inert carrier gas is established. A chromium (III) compound is added to the fluidized support particles to provide a supported catalyst component. The supported catalyst component is activated to convert at least a portion of the chromium (III) to Chromium (VI). The chromium (III) containing particles may be recovered from the fluidized bed and then activated or they may be activated in the fluidized bed. Also the support particles can be treated in the fluidized bed with other treatment agents. The support particles may be pretreated with a solution of a boron treating agent prior to incorporation of the support in the fluidized bed.

17 Claims, 3 Drawing Sheets

US 8,268,943 B2

PREPARATION OF SUPPORTED CHROMIUM CATALYST AND POLYMERIZATION PROCESS

This application is a divisional application of U.S. patent application Ser. No. 12/012,038 filed Jan. 31, 2008.

FIELD OF THE INVENTION

This invention relates to a process for the preparation of a supported chromium catalyst and the polymerization of ethylene to produce ethylene homopolymers and copolymers with a chromium-based polymerization catalyst.

BACKGROUND OF THE INVENTION

Polyethylene as a homopolymer or an ethylene alpha olefin copolymer can be employed in a number of commercial applications in which good visual or optical properties are important. For example, polyethylene may be employed in the production of various products such as bottles or other containers and the like which can be produced by blow molding or extrusion molding operations. In such applications, it is desirable to arrive at a product having good optical characteristics in which a desired color is maintained without extensive yellowing of the bottle or other container with time. The resistance of a polymer product to yellowing with time can be measured by the Yellowness Index (YI) as determined in accordance with American Society for Testing Material Standard ASTM-D 1925. Other optical properties which can be important include haze as determined in accordance with ASTMD1003 and gloss as determined in accordance with ASTMD2457.

Significant physical characteristics of polyethylene polymers include the density, the molecular weight distribution, MWD (a ratio of the weight average molecular weight, $M_w$, to the number average molecular weight, $M_n$), melt indices $MI_2$, $MI_5$, HLMI and shear response as determined by the ratio of melt indices as determined in accordance with standard ASTM D1238. Thus, the shear response, SR2, is characterized as a ratio of the high load melt index (HLMI) to the melt index $MI_2$ and the shear response, SR5, is the ratio of the high load melt index to the melt index $MI_5$. The various melt indices are conventionally reported in terms of melt flows in grams/10 minutes (g/10 min.) or the equivalent measure as expressed in terms of decigrams/minute (dg/min.). In the polymerization of ethylene to produce ethylene homopolymers and copolymers, a feedstream comprising ethylene, and optionally a higher molecular weight olefin such as hexene, is supplied to a polymerization reactor along with a polymerization catalyst. The polymerization catalyst may take the form of a Ziegler-Natta catalyst, a metallocene-based catalyst, or a chromium-based catalyst, sometimes referred to as a "Phillips-type" catalyst. Such catalysts typically are supported catalysts which are supplied to the polymerization reactor in particulate form along with a co-catalyst which may be incorporated with the supported catalyst or supplied separately to the polymerization reactor. Co-catalysts, which are employed to activate the primary catalyst, include alkylalumoxanes such as methylalumoxane or tri-alkylaluminums such as triethyl-aluminum in the case of Ziegler-Natta and metallocene catalysts and triethyleborane in the case of the chromium-based catalysts.

The polymer fluff withdrawn from the polymerization reactor is typically separated from the diluent in which the polymerization reaction proceeds, and then melted and extruded to produce particles of the polymer product, typically in the nature of pellets having dimensions of about ⅛"-¼" which then are ultimately used to produce the polyethylene containers or other commercial products. During the extrusion process, stabilizing agents may be incorporated into the polymer. Such stabilizing agents typically include phenolic antioxidants, such as sterically-hindered phenols and phosphite antioxidants. Other polymer characteristics which are significant in terms of suitability of the polymer for the end product include resistance to mechanical failure as measured by notched constant ligament stress (NCLS) and environmental stress crack resistance (ESCR) as determined in accordance with American Society Testing Standard ASTM D1693.

SUMMARY OF THE INVENTION

In accordance with the present invention there is provided a process for the preparation of a chromium-type support olefin polymerization catalyst. In carrying out the invention, there is provided a fluidized bed of particles of particulate support in an inert carrier gas such as nitrogen. A chromium (III) compound is added to the fluidized support particles to provide a supported catalyst component and more specifically, a catalyst component having from 0.1-10 wt. % chromium on the particulate support. The supported catalyst component is activated to convert at least a portion of the chromium (III) on the particulate support to chromium (VI). If desired, the Chromium III containing particles may be recovered from the fluidized bed and then activated. Also the support particles can be treated in the fluidized bed with other treatment agents. Any suitable chromium (III) compound may be employed in carrying out the invention, including chromium acetate, chromium nitrate, t-butyl chromate, and chromium trioxide. Mixtures of such Chromium III compounds may also be employed. In a specific application of the invention, the chromium (III) compound is chromium acetate which is added as an aqueous solution of chromium acetate in a chromium concentration within the range of 5-15 wt. %. The chromium acetate solution may be added in an amount effective to provide a chromium content within the range of 0.1-10 wt. % on the support particles.

In a further aspect of the invention, the support particles are pretreated with a solution of a boron treating agent, specifically, triethylboron, in a hydrocarbon solvent prior to incorporation of the support in the fluidized bed. In this aspect of the invention the triethylboron is added in an amount effective to provide a triethylboron content on the support particles within the range of 0.1-5.0 wt. % of the support particles. In another embodiment of the invention, the particulate support is silica having an average particle size within the range of 25-150 microns and a surface area of at least 200 m²/g and more particularly within the range of 300-400 m²/g. In a more specific aspect of this invention, the inert carrier gas comprises nitrogen gas. The supported chromium catalyst is activated by heating the supported catalyst to a temperature within the range of 450-900° C. for a time effective to convert a predominate portion of the chromium (III) on the support to chromium (VI). The supported chromium catalyst component may be activated within the fluidized bed or it may be recovered from the fluidized bed and then activated.

In yet another embodiment of the invention there is provided a process for the polymerization of an ethylene polymer. In carrying this process, a feedstream comprising an inert hydrocarbon diluent containing a minor amount of ethylene is supplied to a polymerization reaction zone. A supported chromium catalyst, produced by the deposition of chromium (III) on a fluidized bed of support particles followed by conversion to chromium (VI) as described above, is incorporated in the feedstream within the polymerization reaction zone. The reaction zone is operated under polymerization conditions to produce a polyethylene polymer fluff which is withdrawn from the reaction zone. The polyethylene polymer fluff is heated to a temperature sufficient to melt the fluff and is thereafter extruded to produce pellets of the polyethylene polymer. In the polymerization reaction zone, the reaction zone is operated under conditions effective to provide an activity of the polymer product which is greater than the corresponding activity in the production of a polymer product produced under identical polymerization conditions but with a catalyst produced by the deposition of a chromium (III) component on a corresponding support by static mixing of the chromium (III) compound on the corresponding support in accordance with the conventional procedure for making supported chromium catalysts. In one embodiment of the invention, the polyethylene polymer fluff is a polyethylene homopolymer. In another embodiment of the invention the polymer is a co-polymer of ethylene and a higher molecular weight olefin produced by copolymerizing the ethylene with higher molecular weight olefin. In a further aspect of the invention, the higher molecular weight olefin is a $C_3$-$C_8$ olefin, and more particularly, hexene in a concentration which is less than the 50 wt. % of the concentration of ethylene in the feedstream.

DETAILED DESCRIPTION OF THE INVENTION

Figure 1:
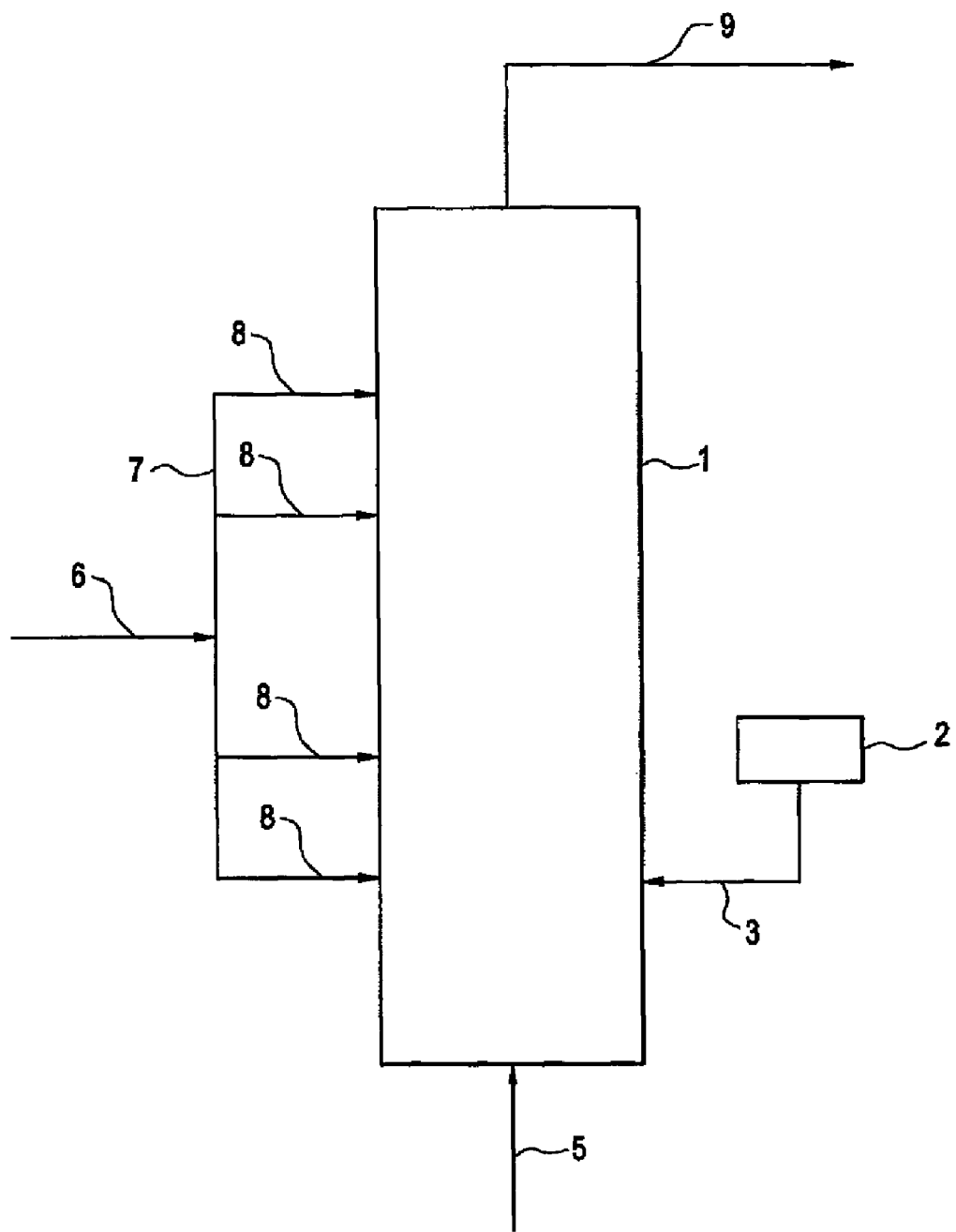
FIG. 1 is a schematic illustration of a vertical fluid bed reactor which may be employed in the preparation of a supported olefin polymerization catalyst in accordance with the present invention.

The invention will be described with reference to a vertical oriented activator for preparation of a supported catalyst and a loop-type reactor used in the production of ethylene homopolymers or copolymers. Referring initially to FIG. 1, there is illustrated a catalyst activator comprising a vertical tubular reactor 1 supplied with particulate support materials such as silica from a suitable source 2 through an inlet line 3. The inlet line 3 supplies the silica or other particulate support material to the interior of the reactor where in it is entrained within an upwardly flowing stream of nitrogen introduced into the reactor tube via a lower inlet 5. In one aspect of the invention as described below, the silica support is pretreated with triethylboron. A chromium (III) compound, such as an aqueous solution of chromium acetate, is supplied into the reactor tube from an inlet line 6 and to an injector 7 comprising a manifold and a plurality of injection nozzles 8 spaced longitudily along the reactor. The rate of flow of the fluidized bed of silica or other particle support through the reactor tube and the injection rate of the chromium (III) compound via inlet line 6 and injector 7 are controlled in order to provide a period of contact with the chromium (III) compound and the silica effective to arrive at the desired loading of chromium on the catalyst support. The fluidized bed of the support material containing the chromium (III) catalyst component is withdrawn from the top of the reactor via outlet line 9 and then passed to a suitable concentrator (not shown) from which the loaded chromium (III) catalyst component is recovered. The supported catalyst component can then be activated by heating the catalyst to a suitable activation temperature, specifically within the range of 450-900° C., in order to convert the chromium (III) compound to a chromium (VI) catalyst component.

After activation, the supported catalyst component can be employed in the polymerization or co-polymerization of ethylene in accordance with any suitable polymerization procedure. Batch-type or loop-type polymerization reactors may be employed although most commercial operations will typically use one or more loop-type polymerization reactors. Where a plurality of reactors are employed, they may be connected in series. As described previously, the silica or other support may be pretreated with a boron treating agent prior to contacting the chromium (III) compound with the support, or a boron treating agent may be incorporated onto the support with the Chromium III compound prior to activation. If the catalyst support is not pretreated with boron, a boron treating agent can be added separately along with the supported catalyst component to the polymerization reactor. Although it may not be necessary, even if the supported material is pretreated with a boron treating agent, or if a boron treating agent is incorporated along with the Chromium III compound, an additional amount of boron can be added in the course of the polymerization reaction.

Any suitable boron treating agent may be employed in carrying out the present invention. As indicated above and as described later, the boron treating agent may be incorporated onto the silica or other support by a pretreatment protocol or the boron may be incorporated into the catalyst along with the chromium compound and other free agents prior to activation of the catalyst component to convert Chromium III compound to Chromium VI. In addition to triethylboron, which is a common treating agent used in the formulation of chromium catalysts, other boron treating agents include tributylborane, specifically tri-n-butylborane, tributylborate, trimethylborate, dimethylboron and various tri-substituted borons, such as disclosed in U.S. Pat. No. 7,241,850 to Burmaster et al, the entire disclosure which is incorporated herein by reference.

Figure 2:
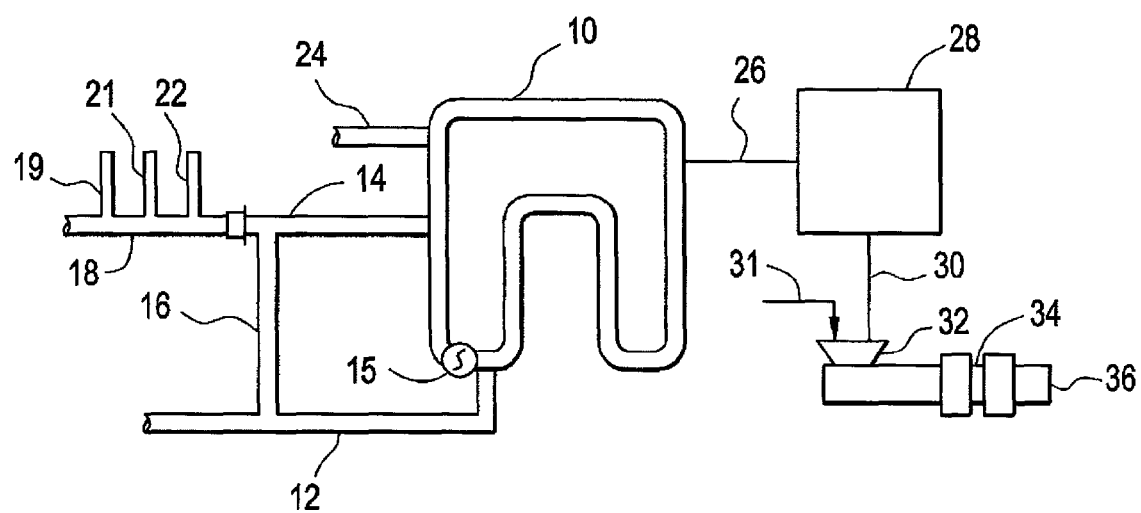
FIG. 2 is a schematic illustration of a process for the polymerization of ethylene and a comonomer in which a polymerization process in accordance with the present invention is implemented.

Referring now to FIG. 2, there is illustrated a loop-type polymerization reactor 10 which may be employed in carrying out the invention. The reactor is supplied with a feed stream comprising a diluent and ethylene monomer through an input line 12 and a catalyst system through an input line 14. The continuous loop-type reactor is, as will be understood by those skilled in the art, equipped with an impeller 15 which functions to circulate the polymerization reaction mass continuously through the loop-type reactor under controlled temperature and pressure conditions. The polymerization reactor may be operated under any suitable conditions. Liquefied isobutane may be used as the diluent medium in the course of the polymerization reaction within reactor 10. Alternatively, a higher molecular weight diluent such as hexane can be used.

The supported catalyst component and co-catalyst may be introduced into the polymerization reactor by any suitable technique. In one mode of operation, the catalyst system may be introduced into the reactor employing a catalyst injection system of a type often employed for Phillips-type silica supported chromium catalysts. In this mode of application, a catalyst system, comprising a supported chromium-based catalyst component as described previously and a boron based co-catalyst, such as a triethylboron (TEB) co-catalyst, if not added originally to the particulate support material, is incorporated into the polymerization reactor through catalyst feed line 14. In the catalyst injection system, a diluent, such as isobutane, is supplied to a mixing line 18 via a supply line 19. The co-catalyst, if added separately, is supplied through line 21 and the supported chromium-based catalyst component is introduced through line 22, and the catalyst system is then introduced into the reactor 10 via line 14. Alternatively or in addition to introduction through line 14, the catalyst system may be passed through line 16 to line 12 for introduction to reactor 10. The catalyst may be supplied either continuously or intermittently to the carrier stream for introduction into the reactor. The catalyst may be prepolymerized prior to introduction into the polymerization reactor 10. For example, the supported chromium based catalyst component and the co-catalyst may be pre-polymerized in a tubular reactor prior to introduction into the reactor, as described in U.S. Pat. No. 4,767,735 to Ewen et al. For a further description of suitable prepolymerization procedures which may be employed in carrying out the invention, reference is made to the aforementioned U.S. Pat. No. 4,767,735, the entire disclosure of which is incorporated herein by reference. In another mode of operation, the supported chromium-based catalyst and the co-catalyst may be introduced into the polymerization reactor through separate feed lines. For example, referring to FIG. 2, the chromium-based catalyst may be introduced into the reactor through line 14 (without pre-mixing with the co-catalyst) and the co-catalyst is introduced into the reactor through a separate line 24. The separate line 24 may be located upstream or downstream of the point of introduction of the chromium-based catalyst through line 14. As indicated in the drawing, a suitable location of the separate line 24 is upstream of line 14 and provides for the introduction of the co-catalyst into the reactor shortly after introduction of the supported chromium-based polymerization catalyst. As indicated previously, the separate introduction of the TEB co-catalyst is not necessary where the support, prior to or concomitantly with the incorporation of the chromium (III) compound, is treated or pretreated with a solution of triethylborane or other treating agent. Alternatively, the support may be pretreated with TEB and a separate solution of a co-catalyst introduced along with the supported catalyst.

At the product side of the reactor, the ethylene homopolymer or copolymer is withdrawn via line 26. Typically, a deactivator is incorporated into the product stream in order to terminate the polymerization reaction in the solvent stream containing the polyethylene. The product is supplied through line 26 to a concentration and recovery system 28 in which polyethylene fluff is extracted. Diluent and unreacted ethylene are recovered through a suitable purification and recovery system (not shown) and recycled to the reactor 10. The product stream containing the polyethylene fluff, which is now free of gaseous ethylene, is withdrawn from the recovery system via line 30.

The polyethylene fluff is supplied to the input hopper 32 of an extruder-die system 34. Stabilization additives are supplied to the hopper 32 through line 31. In the extruder-die system, the polymer is heated to a molten state, and the molten polymer is extruded and then cut into appropriate particles. Typically, the polyethylene product may be extruded and die cut into pellets which are discharged from the product end 36 of the extruder-die system 34. These pellets may then be heated and extruded and molded in various applications, such as in the production of bottles or other polyethylene products.

While organic support materials, such as particles of insoluble polymers, may be employed as the particulate support in carrying out the invention, the support material normally will be an inorganic material of the type commonly employed for chromium-based catalysts. Such supports may take the form of silica, alumina, or silica-alumina phosphate supports, such as disclosed in U.S. Pat. Nos. 6,423,663 to Debras and 6,489,428 to Debras et al. Aside from the unique manner in which the chromium (III) compound is incorporated on to the fluidized support particles with subsequent activation of the catalyst, the chromium catalyst may be of the type disclosed in the aforementioned U.S. Pat. Nos. 6,423,663 and 6,489,428. Thus the supported chromium-based catalyst may also include additives, such as titanium, as disclosed in the Debras and Debras et al patents. The ultimate chromium content of the supported chromium containing support component of the present invention will normally be somewhat higher than the chromium content of the catalyst disclosed in the aforementioned Debras and Debras et al patents. Thus, the chromium loading on the support particles will normally, after activation of the chromium (III) to chromium (VI), be within the range of 0.1-10 wt. % and more specifically with the range of 0.5-8 wt. %. For a further description of chromium-based catalyst components, reference may be made to the aforementioned U.S. Pat. Nos. 6,423,663 and 6,489,428, the entire disclosures of which are incorporated herein by reference.

In carrying out the invention, the silica or other support material employed in the activator 1 of FIG. 1, normally will be dried by heating an inert gas atmosphere at a temperature of about 50°-300° C. If the support is to incorporate titanium, a titanation procedure can be carried out prior to forming the fluidized bed of support material. Where triethylboron is also incorporated in the support component, the silica or the other support material may be pretreated with a solution of triethylboron in an organic solvent, such as hexane.

In the operation of the catalyst reactor as described above with reference to FIG. 1, the chromium (III) containing catalyst particles are recovered from a fluidized bed reactor and then subject to activation to convert the chromium (III) on the particulate support to chromium (VI). In another embodiment of the invention, the support particles, chromium compounds and treating agents, such as TEB, can be supplied to a reactor in which the chromium (III) is loaded on the support and activated to chromium (VI) without first separately being recovered from the reactor.

Figure 3:
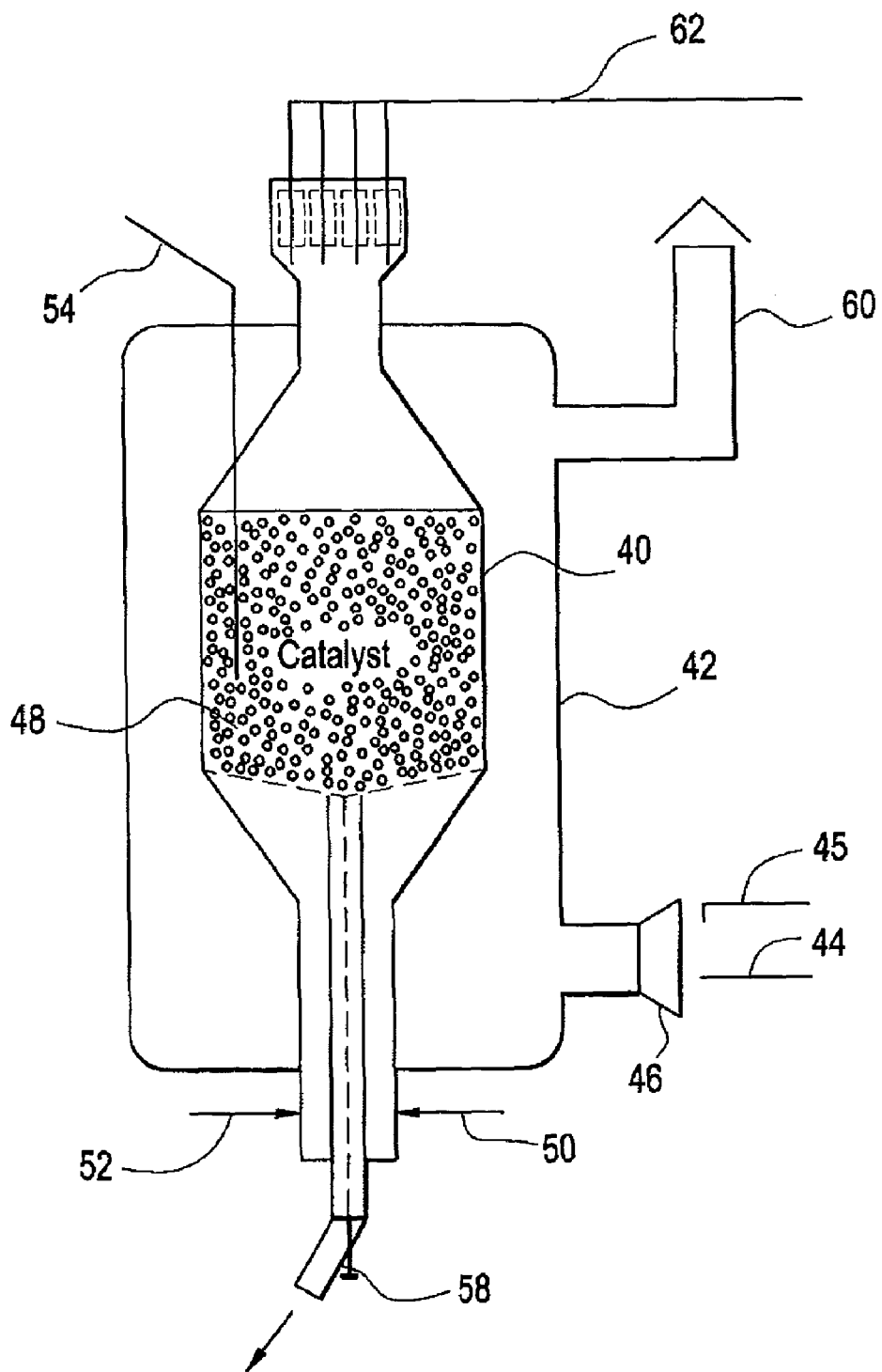
FIG. 3 is a schematic illustration of another reactor comprising an activator which can be employed in preparation of a supported olefin polymerization catalyst in accordance with the present invention.

In this embodiment of the invention, as illustrated in FIG. 3, a fluidized bed reactor 40 is incorporated within a heating furnace 42 which is supplied by a fuel gas line 44 and combustion air line 45 via burner 46. The fluidized catalyst bed 48 within the furnace compartment 42 is supplied with a chromium (III) compound such as described herein via line 50. Modifiers such as treating agents incorporating boron or titanium as described above may also be added via line 50. A fluidization gas, such as nitrogen or air, which functions to entrain support particles, is supplied to the fluidized catalyst bed 48 via line 52. A support material such as silica is supplied via line 54 to the catalyst bed where it is loaded with the chromium compound. In operation of the activator, the furnace is heated to a temperature sufficient to convert the chromium (III) compound to a chromium (VI) catalyst component in the course of operation of the activator. The supported activated catalyst is withdrawn from the activator via line 58 and supplied to a catalyst bin (not shown) for ultimate use in olefin polymerization. Hot combustion gases are withdrawn from the furnace via a flue stack 60 and hot activation air is withdrawn from the top of the fluidized bed chamber and supplied to a quench chamber (not shown) via line 62. The operating parameters as described with reference to the operation of the reactor shown in FIG. 1 can also be employed in the operation of the reactor shown in FIG. 3 in which activation of the chromium catalyst takes place in the course of loading the chromium compound onto the support particles.

As noted previously, chromium acetate is an effective treating agent for incorporating chromium (III) on the particulate support particles. The chromium acetate may be employed in an aqueous solution having a chromium acetate concentration within the range of 5-15 wt. % and more specifically 9-12 wt. %. The chromium acetate solution is added to the activating reactor to provide chromium loading on the support particles within the range of 0.1-10 wt. % and more specifically 7-9 wt. %. A final loading of about 8 wt. % chromium (III) on the support particles results in an effective catalyst component for the preparation of ethylene polymers in accordance with the present invention.

In addition to chromium acetate, other suitable chromium (III) compounds which can be employed in carrying out the present invention include chromium acetate, chromium nitrate, t-butyl chromate, and chromium trioxide. The desired ultimate loading of the chromium (III) compound on the support usually will remain at the same values as when employing chromium (III) acetate. Chromium loading of about 1 wt. % is expected to be as effective, or nearly as effective, as the higher chromium loadings.

Upon recovery of the supported catalyst component containing chromium (III), the catalyst component can then be activated to convert the chromium (III) compound on the support to chromium (VI). Activation may be carried out temperatures within the range of 450-900° C., and more specifically 600-850° C. A suitable activation procedure for converting the chromium (III) on the support particles to chromium (VI) involves heating the recovered chromium bearing support particles at a temperature of about 700° C. for a period of about 1-10 hours. The activation heating is carried out for a time sufficient to convert at least a predominate portion of the chromium (III) on the support to chromium (VI). Desirably, substantially all of the chromium (III) is converted to chromium (VI) in order to provide optimum or near optimum catalyst activity in ethylene polymerization.

In experimental work carried out with respect to the present invention, silica supports having physical parameters as set forth in Table 1 were employed to form supported catalyst components. In one case a silica support was pretreated with a 1.0 wt. % solution of triethylboron in hexane under a nitrogen blanket to form a catalyst identified in Table 1 as catalyst A.

A second catalyst denominated in Table 1 as catalyst B was formed employing the identical silica support of catalyst A but without pretreatment with triethylboron. Additional supported catalysts employed in the experimental work are commercial catalysts identified in Table 1 as Catalysts C and D with the support parameters set forth in Table 1. Silica supports for catalysts C and D were formed by impregnation of the silica supports with a solution of chromium acetate following the treatment procedures as set forth in the aforementioned patents to Debras and Debras et al. That is, rather than incorporating the chromium III compound in a fluidized bed of support particles as involved in the present invention, the support particles were employed by adding the chromium III solution to the dried silica until the bed of silica was completely saturated.

TABLE 1

| Catalyst | A | B | C | D |
|---|---|---|---|---|
| Pre-treatment | TEB | None | None | None |
| Surface Area (m$^2$/g) | 317 | 317 | 300 | 315 |
| Pore Volume (ml/g) | 1.7 | 1.7 | 1.1 | 1.6 |
| Avg. Pore Diameter (Å) | 215 | 215 | 147 | 203 |

In polymerization tests carried out employing Catalysts A, C and D, ethylene homopolymers and ethylene copolymers were produced in standardized laboratory polymerization runs to produce polymer fluff corresponding to each catalyst. The polymerizations were carried out employing 8 wt. % ethylene in an isobutene diluent at a polymerization temperature of 104° C. Tests in each case were carried out to produce a final productivity of about 1000 grams of polymer per gram of catalyst. Where co-polymers were prepared the diluent contained 0.18 wt. % 1-hexene in addition to 8 wt. % ethylene.

The results of the polymerizations carried out to produce ethylene homopolymers are set forth in Table 2 and the corresponding results for the ethylene 1-hexene copolymers are set forth in Table 3.

TABLE 2

| Catalyst | A | C | D |
|---|---|---|---|
| Pre-treatment | TEB | None | None |
| Activation Temperature (° F.) | 1,300 | 1,300 | 1,400 |
| Activity (g PE/g Cat/h) | 1,700 | 1,200 | 400 |
| MI$_2$ (dg/min) | 0.11 | 0.05 | 0.40 |
| MI$_5$ (dg/min) | 0.75 | 0.29 | 1.33 |
| HLMI (dg/min) | 12.7 | 9.0 | 20 |
| SR2 (HLMI/MI$_2$) | 115 | 180 | 49 |
| SR5 (HLMI/MI$_5$) | 16.9 | 31.0 | 14.7 |
| Density (g/cc) | 0.9613 | 0.9589 | 0.9624 |

TABLE 3

| Catalyst | A | C | D |
|---|---|---|---|
| Pre-treatment | TEB | None | None |
| Activation Temperature (° F.) | 1,300 | 1,300 | 1,400 |
| Activity (g PE/g Cat/h) | 1,900 | 1,600 | 1,100 |
| MI$_2$ (dg/min) | 0.15 | 0.09 | 1.13 |
| MI$_5$ (dg/min) | 0.98 | 0.59 | 4.1 |
| HLMI (dg/min) | 18.1 | 13.1 | 53.2 |
| SR2 (HLMI/MI$_2$) | 121 | 146 | 47 |
| SR5 (HLMI/MI$_5$) | 18.5 | 22.2 | 13 |
| Density (g/cc) | 0.9575 | 0.9564 | 0.9589 |

As can be seen from an examination of the data presented in Tables 2 and 3, catalyst A, produced in accordance with the present invention, provided substantially higher activities in both the homopolymerization and the copolymerization runs. In considering the physical parameters of the support particles as set forth in Table 1, it will be noted that catalyst D was very close to catalyst A in terms of surface area, pore volume and average pore diameter. Catalyst C had a surface area somewhat lower than catalysts A and D and had pore volume and pore diameter volume lower than those of catalysts A and D. Catalyst A had higher melt flow potentials as measured by MI$_2$ and MI$_5$ than catalyst C but somewhat lower than catalyst D notwithstanding the similar pore volumes and surface areas. The higher activation temperature used for Catalyst D explains somewhat the higher melt flows for that system. The shear response data is measured by SR2 and SR5 for catalyst A was lower than catalyst C, but higher than for catalyst D.

As indicated by the foregoing experimental data, the present invention enables formation of so-called "green" chromium III-chromium VI catalysts of substantially greater activities than accomplished with catalysts produced by the impregnation techniques of the prior art. In addition, melt flow and shear response volume can be achieved to provide polymer characteristics between those of the prior art catalysts C and D.

Having described specific embodiments of the present invention, it will be understood that modifications thereof may be suggested to those skilled in the art and it is intended to cover all such modifications as fall within the scope of the appended claims.

The invention claimed is:

1. A method for the preparation of a supported olefin polymerization catalyst comprising:
    (a) providing a fluidized bed of particles of particulate support materials in a stream of an inert carrier gas to a reactor;
    (b) entraining the particulate support material within the reactor to form a fluidized bed;
    (c) introducing, an aqueous solution of a chromium (III) compound to the reactor;
    (d) impregnating the particulate support material with the chromium (IIII) compound to form a supported chromium catalyst; and
    (e) activating the supported chromium catalyst by converting a predominate part of the chromium (III) on the particulate support particles to chromium (VI) to form the supported olefin polymerization catalyst.

2. The method of claim 1 wherein said chromium III compound is added in amount to provide a chromium loading on said support particles within the range of 0.1-10 wt. % per said support particles.

3. The method of claim 1 wherein the reactor is an elongated reactor and said chromium (III) compound is added to said fluidized bed at a plurality of location spaced longitudely of said reactor.

4. The method of claim 1 wherein said chromium (III) compound is selected from the group consisting of chromium acetate, chromium nitrate, t-butyl chromate, and chromium trioxide.

5. The method of claim 1 wherein said chromium (III) compound is chromium acetate.

6. The method of claim 5 wherein the aqueous solution of chromium acetate has a chromium concentration within the range of 5-15 wt. %.

7. The method of claim 5 wherein said chromium acetate solution is added in an amount to provide a chromium loading on said support particles within the range of 0.1-10 wt. %.

8. The method of claim 1 further comprising prior to the incorporation of said particulate support in said fluidized bed, pretreating said support particles with a boron treating agent.

9. The method of claim 7 wherein said boron treating agent is triethylboron which is added in an amount to provide a triethylboron content on said support particles within the range of 0.1-5 wt. %.

10. The method of claim 1 wherein said particulate support is silica having an average particle size within the range of 25-150 microns and a surface area of at least 200 $m^2/g$.

11. The method of claim 10 wherein said silica has a surface area within the range of 300-400 $m^2/g$.

12. The method of claim 1 wherein said inert carrier gas comprises nitrogen gas.

13. The method of claim 12 wherein said chromium (III) compound added to said support particles in an amount to provide a chromium loading on said support particles within the range of 0.1-10 wt. % chromium.

14. The method of claim 13 wherein said chromium (III) compound is chromium acetate.

15. The method of claim 14 wherein said particulate support is silica having an average particle size within the range of 25-150 microns and an average surface area within the range of 300-400 $m^2/g$.

16. The method of claim 1 wherein said supported chromium catalyst is activated by heating said supported catalyst to a temperature within the range of 450-900° C. for a time effective to convert a predominant amount of said chromium (III) on said particulate support to chromium (VI).

17. The method of claim 1 further comprising recovering said chromium containing support component from said fluidized bed and thereafter activating said chromium containing support component in accordance with subparagraph (c).

* * * * *